United States Patent
Hillereau et al.

(10) Patent No.: US 8,528,857 B2
(45) Date of Patent: Sep. 10, 2013

(54) TRANSLATABLE JET ENGINE THRUST REVERSER CONFIGURATION PROVIDING IMPROVED MAINTENANCE ACCESS

(75) Inventors: Nicolas Hillereau, Le Havre (FR); Jerome Collier, Le Havre (FR); Guy Bernard Vauchel, Le Havre (FR)

(73) Assignee: Aircelle, Gonfreville L'Orcher (FR)

( * ) Notice: Subject to any disclaimer, the term of this patent is extended or adjusted under 35 U.S.C. 154(b) by 612 days.

(21) Appl. No.: 12/517,299

(22) PCT Filed: Nov. 19, 2007

(86) PCT No.: PCT/FR2007/001892
§ 371 (c)(1),
(2), (4) Date: Jun. 23, 2009

(87) PCT Pub. No.: WO2008/087261
PCT Pub. Date: Jul. 24, 2008

(65) Prior Publication Data
US 2010/0001123 A1  Jan. 7, 2010

(30) Foreign Application Priority Data
Jan. 15, 2007  (FR) ..................................... 07 00249

(51) Int. Cl.
*F02K 1/54* (2006.01)
(52) U.S. Cl.
USPC .................... 244/110 B; 60/226.2
(58) Field of Classification Search
USPC ............... 244/54, 53 R, 110 B; 60/796, 797, 60/230, 226.3, 226.2; 248/554, 555, 556, 248/557; 239/127.1–127.3, 265.11–265.43
See application file for complete search history.

(56) References Cited

U.S. PATENT DOCUMENTS

| | | | |
|---|---|---|---|
| 3,511,055 A | 5/1970 | Timms | |
| 5,609,313 A * | 3/1997 | Cole et al. | 244/54 |
| 6,179,249 B1 * | 1/2001 | Canadas | 244/53 R |
| 6,227,485 B1 | 5/2001 | Porte | |
| 6,340,135 B1 * | 1/2002 | Barton | 244/53 B |

(Continued)

FOREIGN PATENT DOCUMENTS

| EP | 1413734 | 4/2004 |
|---|---|---|
| WO | 2006/134253 | 12/2006 |

OTHER PUBLICATIONS

International Search Report PCT/FR2007/001892; Dated Jul. 10, 2008.

*Primary Examiner* — Tien Dinh
*Assistant Examiner* — Michael A Fabula
(74) *Attorney, Agent, or Firm* — Brinks Hofer Gilson & Lione

(57) ABSTRACT

A translatable thrust inverter with grids for a turbojet, that defines at least a portion of the downstream section of a nacelle housing the turbojet. The thrust reversal system includes a front frame secured to a fixed portion of the nacelle and bearing. A first side includes cylinders for the translational actuation of at least one mobile cowling. A second side includes grids for inverting the peripheral thrusts, wherein the front frame includes a fixed portion for securing the front frame to the fixed portion of the nacelle and bearing the diversion grids. The system further includes a portion mounted so as to be capable of translational movement along the longitudinal axis of the nacelle and on which one end of the cowling actuation cylinders is attached, wherein the fixed and mobile portions of the front frame can be removably connected to each other by locking means.

7 Claims, 5 Drawing Sheets

(56) References Cited

U.S. PATENT DOCUMENTS 6,625,972 B1 9/2003 Sternberger
7,484,356 B1 * 2/2009 Lair .............................. 60/226.2
8,091,832 B2 * 1/2012 Marche ...................... 244/129.5

* cited by examiner

TRANSLATABLE JET ENGINE THRUST REVERSER CONFIGURATION PROVIDING IMPROVED MAINTENANCE ACCESS

TECHNICAL FIELD OF THE INVENTION

The present invention relates to a thrust reverser for a jet engine.

BRIEF DISCUSSION OF RELATED ART

An aircraft is propelled by a number of jet engines each accommodated in a nacelle which also houses a collection of auxiliary actuating devices which are associated with its operation and which perform various functions when the jet engine is operating or at a standstill. These auxiliary actuating devices comprise in particular a mechanical system for actuating thrust reversers.

A nacelle generally has a tubular structure comprising an air inlet upstream of the jet engine, a mid-section intended to surround a fan of the jet engine, and a downstream section incorporating thrust reversal means and intended to surround the combustion chamber of the jet engine, and is generally terminated by an exhaust nozzle whose outlet is situated downstream of the jet engine.

Modern nacelles are intended to house a dual-flow jet engine, or turbofan, which, by means of the rotating fan blades, is capable of generating a hot airflow (also known as primary flow) from the combustion chamber of the jet engine, and a cold airflow (secondary flow) which flows around outside the jet engine through an annular passage, also known as a duct, formed between a cowling of the jet engine and an internal wall of the nacelle. The two airflows are ejected from the jet engine via the rear end of the nacelle.

The job of a thrust reverser is to improve the braking capability of an aircraft when it is landing by redirecting forward at least some of the thrust generated by the jet engine. In this phase, the reverser obstructs the cold flow duct and directs this cold flow toward the front of the nacelle, thereby generating a counter-thrust which combines with the braking of the aircraft wheels.

The means employed to achieve this reorientation of the cold flow vary according to the type of reverser.

A common thrust reverser structure comprises a cowling in which there is formed an opening intended for the deflected flow which, when the gases are in a direct-thrust situation, is closed by a sliding cowl and which, in a thrust reversal situation, is uncovered by translationally moving the sliding cowl in a downstream direction (with reference to the direction of flow of the gases) by means of sliding-cowl displacement rams, said displacement rams being mounted on a frame of the cowling upstream of the opening.

The sliding cowl is most often formed by two half-cowls of substantially semi-cylindrical shape which are articulated at the top (at 12 o'clock) on hinges parallel to the direction of translation of the sliding cowl and which are closed by locking elements at the bottom (at 6 o'clock).

This arrangement makes it possible, in the case of maintenance operations, to gain access to the engine or to an internal structure of the reverser by opening the half-cowls.

BRIEF SUMMARY OF THE INVENTION

The present invention proposes, for maintenance purposes, to make it possible to open the sliding cowl more simply via an extra translational travel in the downstream direction.

However, the sliding-cowl displacement rams are deployed to a maximum in a thrust reversal situation and cannot therefore allow such an extra travel in the downstream direction. Moreover, even if that were possible, the rams would impede access to the engine during maintenance.

The present invention aims to avoid these disadvantages and consists, accordingly, of a jet engine thrust reverser with cascade vanes that is intended to form at least part of a downstream section of a nacelle housing the jet engine, comprising a front frame intended to be attached to a fixed part of the nacelle and supporting, on the one hand, rams for translationally actuating at least one movable cowling, and, on the other hand, peripheral thrust reversal cascade vanes, characterized in that the front frame comprises a fixed part intended for attaching the front frame to the fixed part of the nacelle and supporting the deflection cascade vanes, and a part mounted in a translationally movable manner along a longitudinal axis of the nacelle and to which one end of the rams for actuating the cowling is fastened, the fixed and movable parts of the front frame being able to be interconnected in a detachable manner by locking means.

Thus, the fixed and removable parts of the frame of the cowling are attached in an operating configuration of the reverser, but can be detached to allow a translational movement of the removable part of the frame of the cowling together with the sliding cowl in the downstream direction as far as a maintenance configuration in which access is thus opened to the engine and to the internal structure of the reverser.

The sliding-cowl displacement rams do not impede access to the engine during maintenance since they are moved together with the removable part of the frame of the cowling to which they are fastened and together with the sliding cowl.

The translational movement of the assembly formed by the sliding cowl and the removable part of the cowling frame can be achieved manually, or the cowling can be equipped with means for translationally driving the assembly formed by the sliding cowl and the removable part of the cowling frame. These translational drive means are, for example, of the rack and pinion type.

Advantageously, the deflection cascade vanes are supported by way of a truss.

Preferably, the cowling is equipped with means for translationally driving the assembly formed by the sliding cowl and the removable part of the cowling frame. These means may be manual drive means, such as handles, or mechanical drive means. Preferably, the translational drive means are of the rack and pinion type.

According to one possibility, at least one pair of male and female connectors is provided on the frame of the cowling, one secured to the fixed part and the other to the removable part of the frame of the cowling, such that said male and female connectors reach a position of mutual correspondence, or of connection, when the assembly formed by the sliding cowl and the removable part of the cowling frame is engaged in an operating configuration.

Said male and female connectors may be arranged parallel to the direction of translation of the assembly formed by the sliding cowl and the removable part of the cowling frame, such that the disengagement or the engagement in an operating configuration of this assembly is respectively accompanied by a disconnection or by a connection between said male and female connectors.

At least one from among said male and female connectors is, for example, equipped with means for the translational guiding, parallel to the direction of translation, of the assembly formed by the sliding cowl and the removable part of the cowling frame.

To ensure that no fluid enters therein during the maintenance operations, the female connector may be equipped with sealed protection doors capable of pivoting automatically between, respectively, a closed position and an open position depending on whether the assembly formed by the sliding cowl and the removable part of the cowling frame is, respectively, disengaged or engaged in an operating configuration.

The male and female connectors may also be arranged perpendicularly to the direction of translation of the assembly formed by the sliding cowl and the removable part of the cowling frame, and one or other of said male and female connectors may be mounted so as to be movable in axial translation at the bottom of a housing provided for a pin for connecting together the fixed and removable parts of the frame of the cowling, such that the pin, when engaged in its housing, bears against said connector in such a way as to push it toward a lower connection position, said connector being connected to the fixed part of the frame of the cowling and returned into a set-back upper position by way of elastic return means. This arrangement can make it possible to automatically check the correct engagement of the connecting pin in its housing by checking the electrical contact of the connector. For example, a corresponding computer can be programmed to test, when starting the aircraft, the electrical continuity of each of the cables involved. If the result is positive, that means that the connector is properly engaged along with the pin.

In order not to impede the maintenance operations, the fixed part of the cowling frame, or part of this frame, can be pivotally mounted, about a hinge which is parallel to the direction of translation of the sliding cowl, between a closed position and a deployed maintenance position.

BRIEF DESCRIPTION OF THE DRAWINGS

The implementation of the invention will be better understood from the detailed description set out below with reference to the appended drawing.

DETAILED DESCRIPTION OF THE INVENTION

Figure 1:
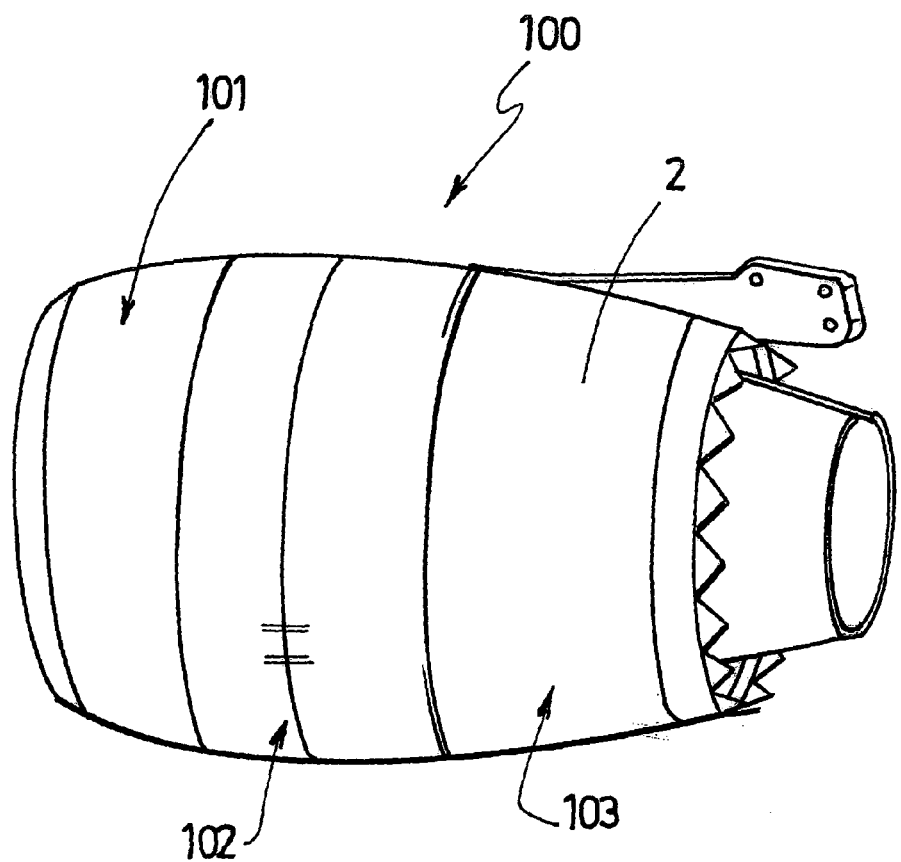
FIG. 1 is a schematic representation of a nacelle according to the invention having downstream cowls in a closed position.
Figure 2:
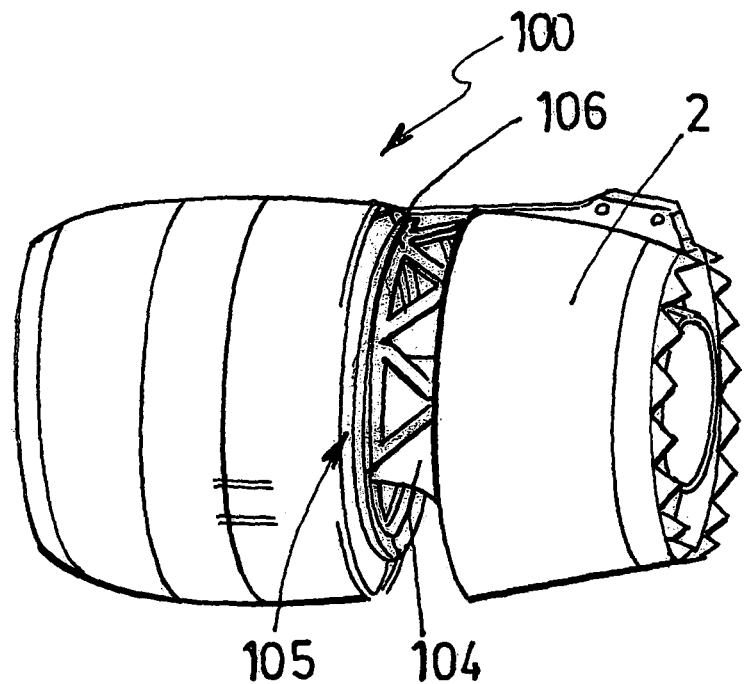
FIG. 2 is a representation of the nacelle in FIG. 1 with its downstream cowls in an intermediate thrust reversal position.
Figure 3:
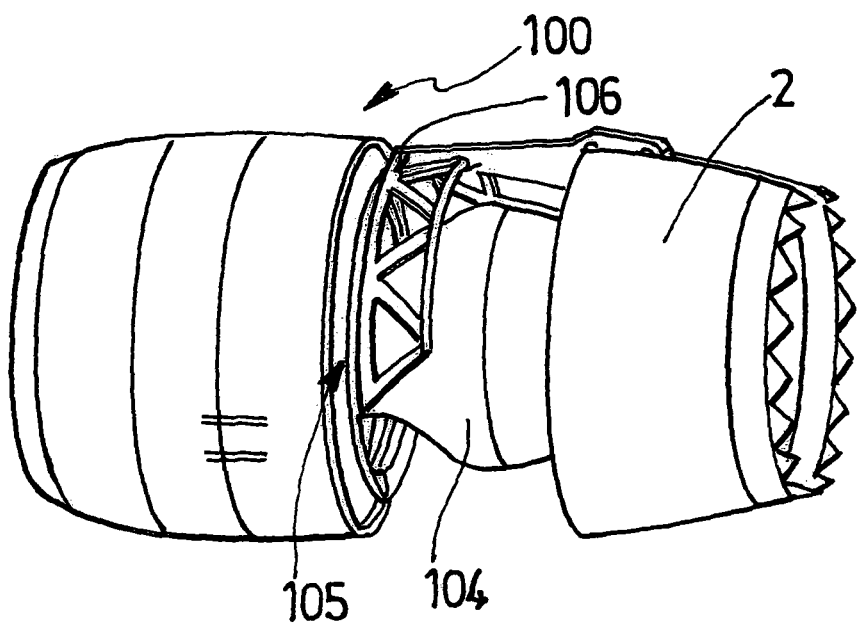
FIG. 3 is a representation of the nacelle in FIG. 1 with its downstream cowls in a completely open position for carrying out maintenance operations.
Figure 4:
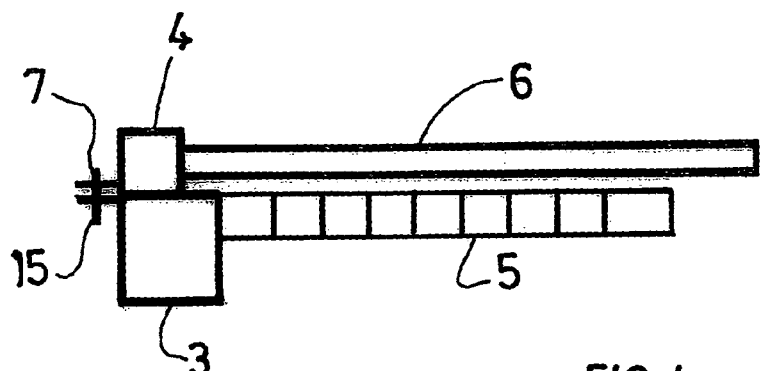
FIG. 4 is a schematic partial view showing the principle, in a longitudinal section plane, of a thrust reverser according to the invention.
Figure 5:
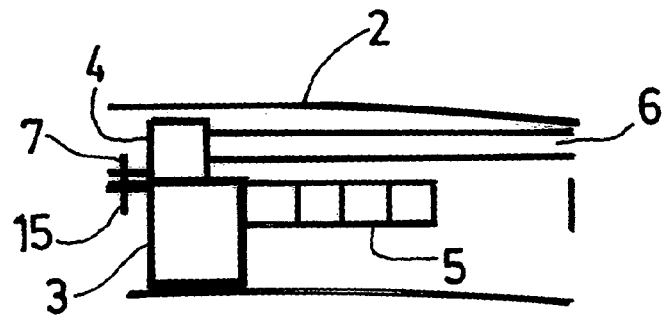
FIG. 5 is an analogous view to FIG. 1 in an operating configuration of the reverser in a direct-thrust situation.

FIGS. 1 to 3 represent a nacelle 100 for a turbofan.

The nacelle 100 constitutes a tubular housing for a turbofan (not visible) and serves to channel the airflows which it generates via the blades of a fan (not visible), namely a hot airflow passing through a combustion chamber of the turbofan, and a cold airflow flowing around outside the turbofan.

The nacelle 100 has a structure comprising a front section 101 forming an air inlet, a midsection 102 surrounding the fan of the turbofan, and a rear section 103 surrounding the turbofan.

The rear section 103 comprises, on the one hand, an external structure incorporating a thrust reversal system, likewise forming an exhaust nozzle, and, on the other hand, an internal cowling structure 104 of the turbofan which, together with the external structure, defines a duct intended for the circulation of the cold flow.

The external structure and its thrust reversal system, illustrated in FIGS. 1 to 7, comprise, on the one hand, a front frame 105 intended to provide the connection between the external downstream structure and the mid-portion 102, said front frame 105 also supporting a peripheral truss 106 on which thrust reversal cascade vanes 5 are mounted, and, on the other hand, a cowling 2 mounted in a translationally movable manner in the downstream direction of the nacelle.

The cowl 2, also termed a "transcowl", is slidably mounted on the front frame 105 by means of guide rails (not shown), and closes this opening of cascade vanes 5 when the gases are in a direct-thrust situation.

In a thrust reversal situation, the sliding cowl 2 is translationally moved in the downstream direction (with respect to the direction of flow of the gases) by means of rams 6, mounted on the frame of the cowling upstream of the opening of cascade vanes 5, so as to uncover said opening of cascade vanes 5.

According to the invention, the front frame comprises a fixed part 3, rigidly connected to a fixed structure of the nacelle 100, such as the turbofan or the mid-section 102, and a movable part 4 to which are attached the heads of the rams 6 used to displace the sliding cowl 2.

The fixed 3 and removable 4 parts of the front frame 105 are structurally attached to one another in a detachable manner by means of one or two quick-release connecting pins 7 which are each mounted in a mutually opposite housing 15 of each ram 6.

Figure 6:
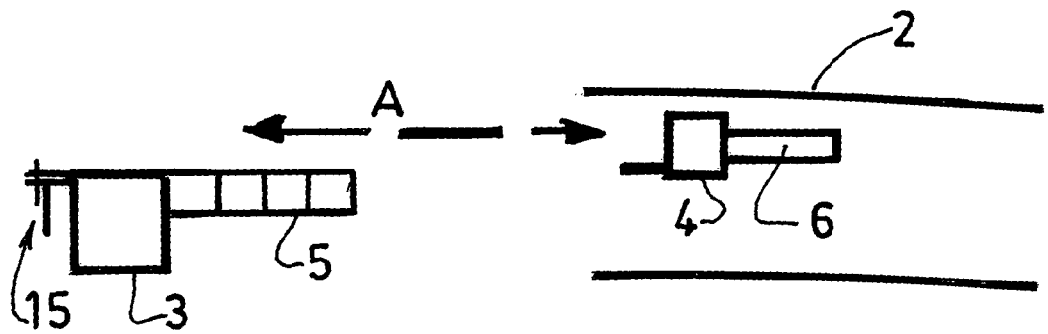
FIG. 6 is an analogous view to FIG. 2 in a maintenance configuration of the reverser.

Once the fixed 3 and removable 4 parts of the front frame have been detached, an assembly formed by the sliding cowl 2, the rams 6 and the removable part 4 of the front frame can be moved translationally in a downstream direction, from an operating configuration (see FIGS. 2 and 5) to a maintenance configuration (see FIGS. 3 and 6).

To this end, the rails for translationally guiding the sliding cowl 2 are of course sufficiently long in order to make it possible to achieve the required uncovered length for the maintenance operations.

Advantageously, in order to bring about this movement in the direction A, the fixed part 3 of the cowling frame is equipped with an electric motor 8 (see FIG. 4) intended to actuate two pinions 9a and 9b which each mesh with a rack 10a or 10b secured to the sliding cowl 2/removable part 4 assembly.

In this instance, the sliding cowl 2 is formed by two semi-cylindrical half-cowls 2a and 2b which are arranged one on either side of a strut or pylon 1 of the aircraft and which are translatable parallel thereto by means of one or other of the racks 10a and 10b.

Control cables (not shown) of the rams 6, intended to pass between the fixed part 3 of the frame of the cowling and the assembly formed by the sliding cowl 2 and the removable part 4 of the cowling frame, comprise an automatic connection and disconnection system (see FIG. 5) taking the form of a pair of male 12 and female 11 connectors provided on the frame of the cowling, one secured to the fixed part 3 and the other to the removable part 4 of the frame of the cowling.

The male 12 and female 11 connectors are arranged parallel to the direction A of translation of the sliding cowl 2/removable part 4 assembly, such that the disengagement or the engagement in an operating configuration of this assembly 2/4 is respectively accompanied by a disconnection or by a connection between the male 12 and female 11 connectors.

The female connector 11 has lateral housings 14a and 14b intended to accommodate lateral translational guide pins 13a and 13b of the male connector 12. The end of the pins 13a and 13b is pointed to facilitate their engagement in their respective housings 14a, 14b, and thus guide the connection between the male 12 and female 11 connectors.

The female connector 11 is equipped with sealed protection doors (not shown) which can pivot automatically between a closed position—when the sliding cowl 2/removable part 4 assembly is disengaged from its operating configuration (translation in the downstream direction)—and an open position—when the sliding cowl 2/removable part 4 assembly is engaged in an operating configuration (translation in the upstream direction).

A tensioning device (not shown), of the rail and pulley type, makes it possible to keep said control cable or cables tensioned while allowing them sufficient "slack" to accompany the movement of the sliding cowl 2/removable part 4 assembly.

Figure 7:
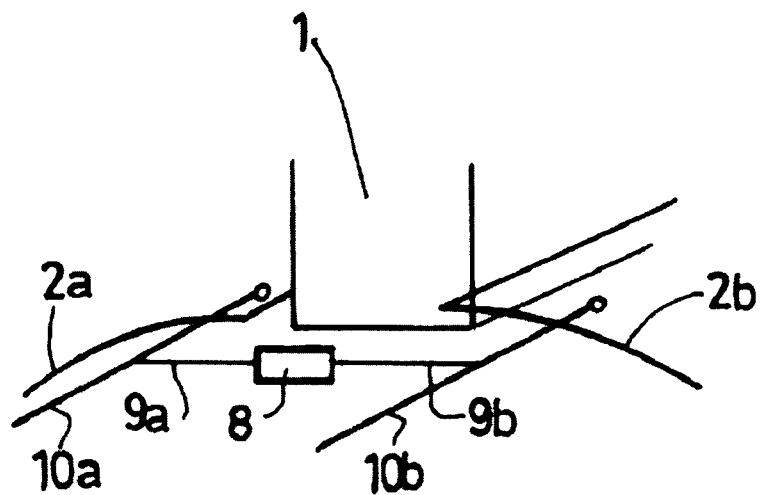
FIG. 7 is a partial schematic view in perspective of the reverser which illustrates means for translationally driving a removable assembly for the maintenance of the reverser.
Figure 8:
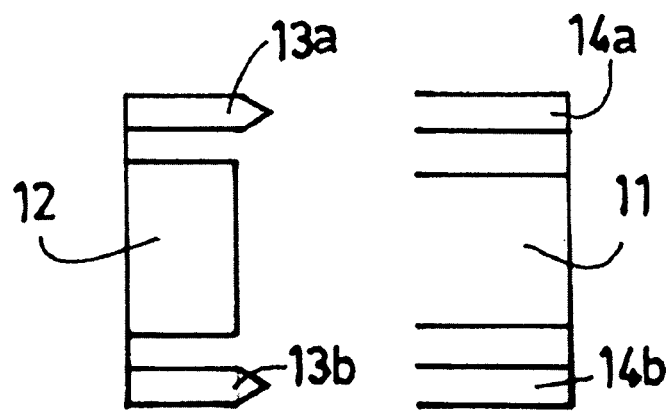
FIG. 8 is a schematic plan view which represents a pair of male and female connectors provided at the interface between the removable assembly for maintenance shown in FIG. 4 and a fixed part of the reverser.
Figure 9:
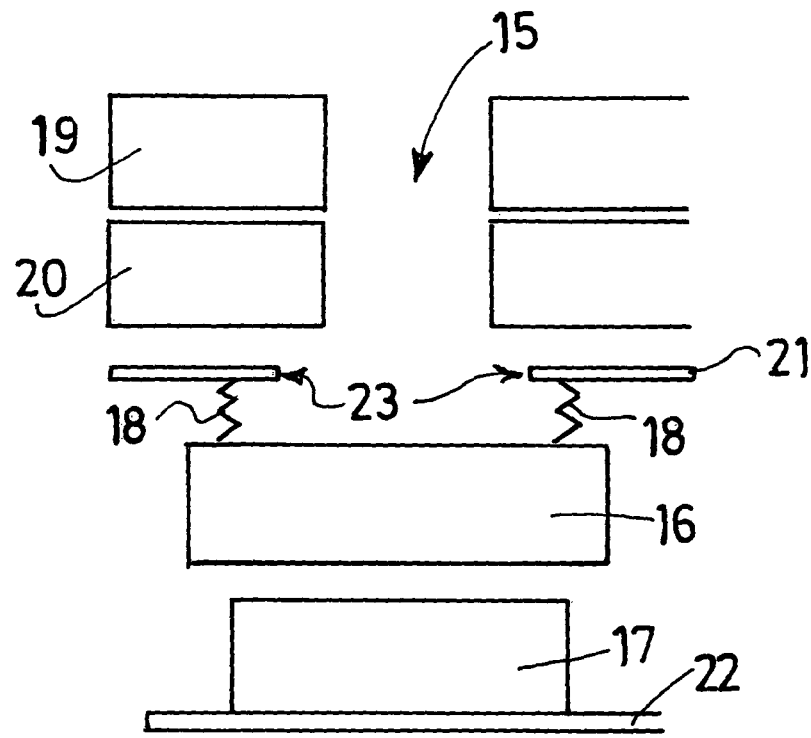
FIGS. 9 and 10 are two schematic views in cross section in the plane of a connecting pin as shown in FIG. 1, which respectively show the pin out of its housing and engaged in its housing.
Figure 10:
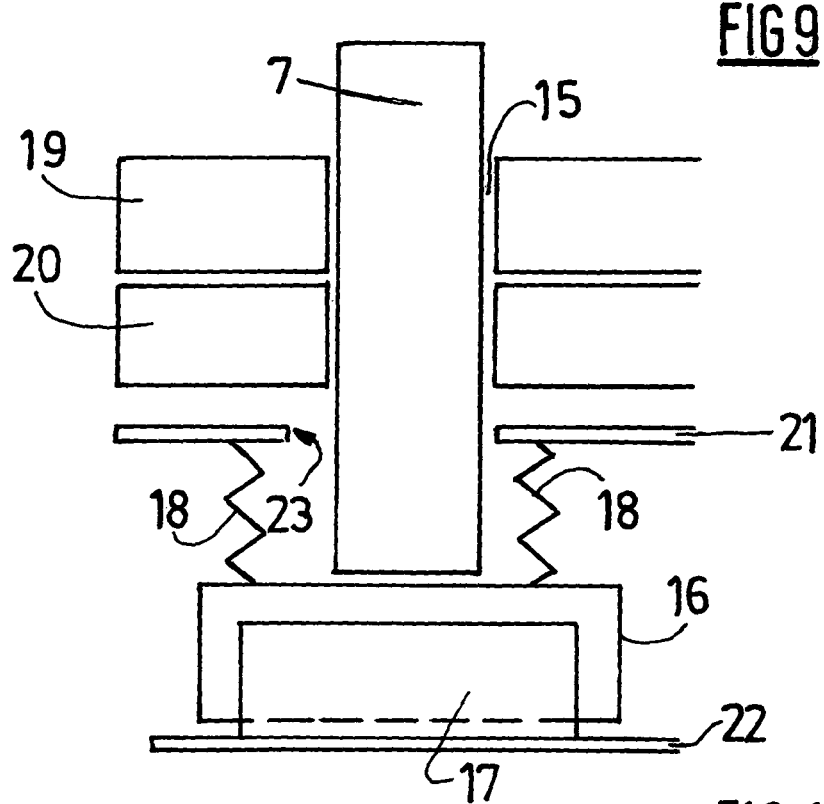

As illustrated in FIGS. 6 and 7, the housing 15 of the connecting pin 7 is provided at the location of hinges 19 and 20 of the fixed 3 and removable 4 parts of the cowling frame.

A pair of male 17 and female 16 connectors, oriented radially perpendicularly to the direction A, is associated with the positioning or removal of each connecting pin 7 into or out of its housing 15.

The female connector 16 is mounted so as to be movable in axial translation at the bottom of the housing 15 such that the pin 7, when engaged in its housing 15, bears against the female connector 16 in such a way as to push it toward a lower connection position.

The male connector 17 is secured to a metal plate 22 connected to the removable part 4 of the cowling frame.

The female connector 16 is connected to a metal plate 21, which is secured to the fixed part 3 of the cowling frame, by means of two return springs 18 arranged one on either side of a perforation 23 which is made in the metal plate 21 opposite the housing 15 and which exposes the female connector 16 at the bottom of the housing 15.

The springs 18 return the female connector 16 into a setback upper position (see FIG. 6).

The pin 7, when positioned in its housing 15 (see FIG. 7), passes through the perforation 23 and pushes the female connector 16 into connection with the male connector 17, against the return action of the springs 18.

The invention facilitates maintenance operations on the engine or on an internal structure of the downstream structure, termed "Inner Fixed Structure" (IFS), and it also has the advantage of being compatible with a so-called "O duct" structure or with a structure having fixed deflection cascade vanes.

In particular, in the case of an O-duct structure, a considerable weight saving is made possible through the complete or partial elimination of the locking elements situated at six o'clock, of the beams situated at twelve and six o'clock, of a maintenance lifting means, or even of the bifurcations situated at twelve and six o'clock. The rails themselves may be integrated directly into the pylon or strut. The O-duct structure may also allow an aerodynamic drag saving and a reduction in diameter of the fan.

The movable structure according to the invention may, for the purpose of being translated into a maintenance position, use the same rail as the one used for opening and closing it in the thrust reverser mode. In this way, all that is necessary is to slightly extend the rails and not to provide new ones, thereby allowing an appreciable weight saving.

The present invention also offers an advantage in terms of safety for the maintenance operators. Specifically, in a configuration according to the prior art, the operator carrying out maintenance is situated beneath the reverser cowl, which, in the event of the lifting means breaking, may close again suddenly and injure the operator. With a configuration according to the invention, no structure can fall on the operator.

Moreover, the invention is also compatible with different modes used for supporting the turbofan and the nacelle by the pylon. This support may be directly between the turbofan and the pylon, or else via the internal fixed structure, or else via the external fixed structure, the latter case being the one represented in FIGS. 1 to 3 to illustrate the present application.

Although the invention has been described using particular exemplary embodiments, it is quite obvious that it is in no way limited thereto and that it comprises all the technical equivalents of the means described together with combinations thereof where these come within the scope of the invention.

The invention claimed is:

1. A thrust reverser with cascade vanes configured to form at least part of a downstream section of a nacelle which houses a jet engine, comprising:
    a front frame attached to a fixed part of the nacelle and supporting peripheral thrust reversal cascade vanes and rams,
        wherein the rams translationally actuate at least one movable cowling along a longitudinal axis of the nacelle,
    wherein the front frame comprises,
        a fixed part for attaching the front frame to the fixed part of the nacelle and for supporting the deflection cascade vanes, and
        a movable part mounted in a translationally movable manner along the longitudinal axis of the nacelle,
        wherein, the rams comprise,
            a first end connected to the movable part, and
            a second end connected to the cowling,
        wherein, the fixed part and the movable part of the front frame are connected in a detachable manner by locking means.

2. The thrust reverser as claimed in claim 1, wherein the deflection cascade vanes are supported by way of a truss.

3. The thrust reverser as claimed in claim 1, wherein the cowling is equipped with a translational drive means.

4. The thrust reverser as claimed in claim 3, wherein said translational drive means are of the rack and pinion type.

5. The thrust reverser as claimed in claim 1, wherein at least one pair of male and female connectors is provided on the front frame, one secured to the fixed part and the other to the movable part of the front frame, such that said male and female connectors reach a position of mutual correspondence, or of connection, when an assembly formed by the sliding cowl and the movable part of the front frame is engaged in an operating configuration.

6. The thrust reverser as claimed in claim 5, wherein said male and female connectors are arranged parallel to the direction of translation of the assembly formed by the sliding cowl and the movable part of the front frame, such that disengagement or engagement in an operating configuration of this assembly is respectively accompanied by a disconnection or by a connection between said male and female connectors.

7. The thrust reverser as claimed in claim 6, wherein at least one from among said male and female connectors is equipped with a translational guiding means.

\* \* \* \* \*

UNITED STATES PATENT AND TRADEMARK OFFICE
CERTIFICATE OF CORRECTION

PATENT NO.        : 8,528,857 B2
APPLICATION NO.   : 12/517299
DATED             : September 10, 2013
INVENTOR(S)       : Hillereau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Fifteenth Day of September, 2015

Michelle K. Lee
*Director of the United States Patent and Trademark Office*